Jan. 12, 1954  P. C. WARD  2,665,668
ENGINE

Filed March 22, 1949  4 Sheets-Sheet 1

INVENTOR.
PATRICK C. WARD

BY

Mellin + Hanson
ATTORNEYS

Jan. 12, 1954   P. C. WARD   2,665,668
ENGINE
Filed March 22, 1949   4 Sheets-Sheet 2

INVENTOR.
PATRICK C. WARD
BY
Mellin + Hanson
ATTORNEYS

Jan. 12, 1954      P. C. WARD      2,665,668
ENGINE
Filed March 22, 1949      4 Sheets-Sheet 3
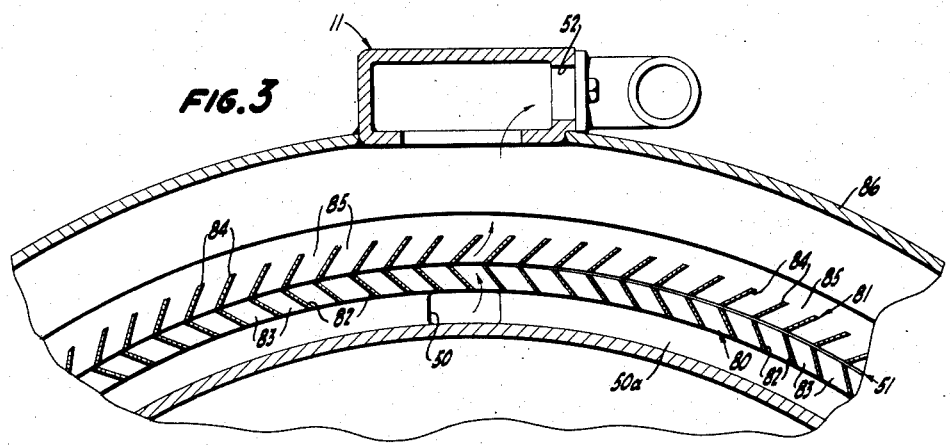
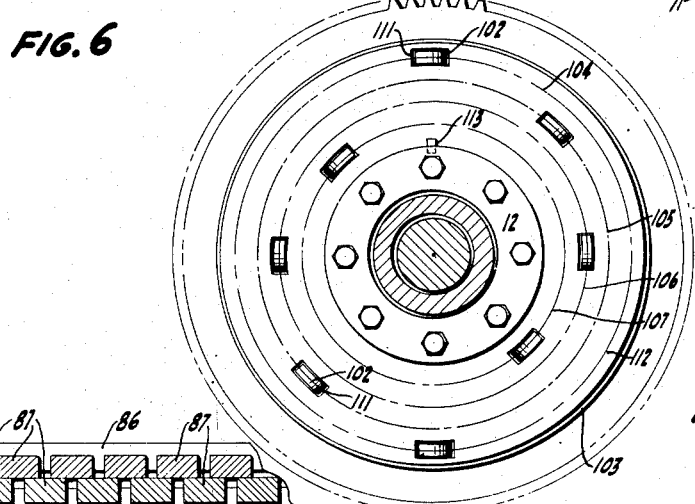
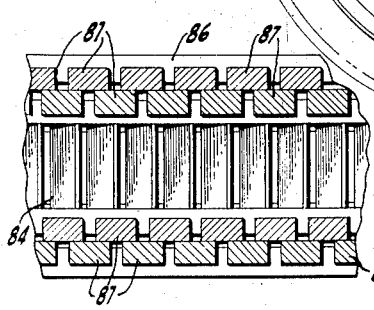
INVENTOR.
PATRICK C. WARD
BY
Mellin + Hanson
ATTORNEYS Jan. 12, 1954 P. C. WARD 2,665,668
ENGINE
Filed March 22, 1949 4 Sheets-Sheet 4

INVENTOR.
PATRICK C. WARD
BY
Mellin + Hanson
ATTORNEYS

Patented Jan. 12, 1954

2,665,668

UNITED STATES PATENT OFFICE 2,665,668

ENGINE

Patrick C. Ward, San Francisco, Calif.

Application March 22, 1949, Serial No. 82,841

3 Claims. (Cl. 123—44)

This invention relates to an internal combustion engine of the type wherein both the crankshaft and the crankcase rotate, the one rotating oppositely to the other.

In engines of the character referred to, certain advantages are inherent. Thus, with both the crankshaft and the crankcase rotating equally but oppositely, and with the speed of either of these elements at half the value of the rotary speed of the crankshaft of an ordinary engine, an equal amount of power will be delivered.

It is an object of the present invention to provide an improved engine of the character described.

It is a further object of the invention to provide an engine of the character described which is adapted to use in aircraft.

It is a still further object of the invention to provide an engine of the character described wherein rotation of the crankcase and crankshaft are synchronized and balanced.

These and other objects of the invention will be apparent from the ensuing description and the appended claims.

One form which the invention may assume is exemplified in the following description and illustrated by way of example in the accompanying drawings, in which:

Fig. 3 is an enlarged section taken along the line 3—3 of Fig. 1, showing the turbine feature of the engine which utilizes thrust of the exhaust gases to gain added power;

Fig. 4 is a section taken along the line 4—4 of Fig. 1, showing a part of the throttle mechanism;

Fig. 5 is a section taken along the line 5—5 of Fig. 1, showing a part of the fuel feed mechanism;

Fig. 6 is a section taken along the line 6—6 of Fig. 1, showing the air cooling and scavenging mechanism;

Fig. 8 is a section taken along the line 8—8 of Fig. 1, showing fragmentarily and in plan view a part of the turbine mechanism;

Figure 1:
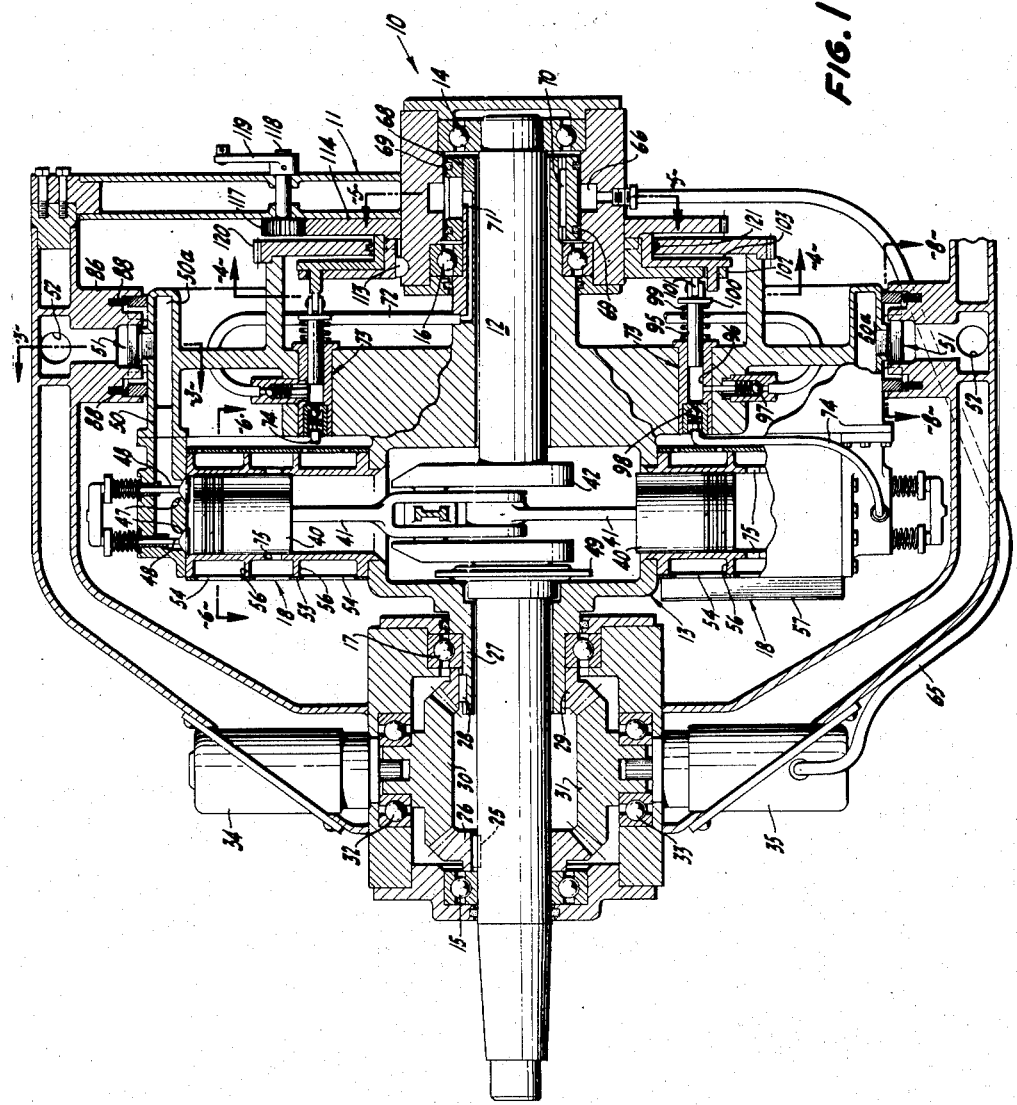
Fig. 1 is a vertical midsection through the internal combustion engine of the invention.
Figure 2:
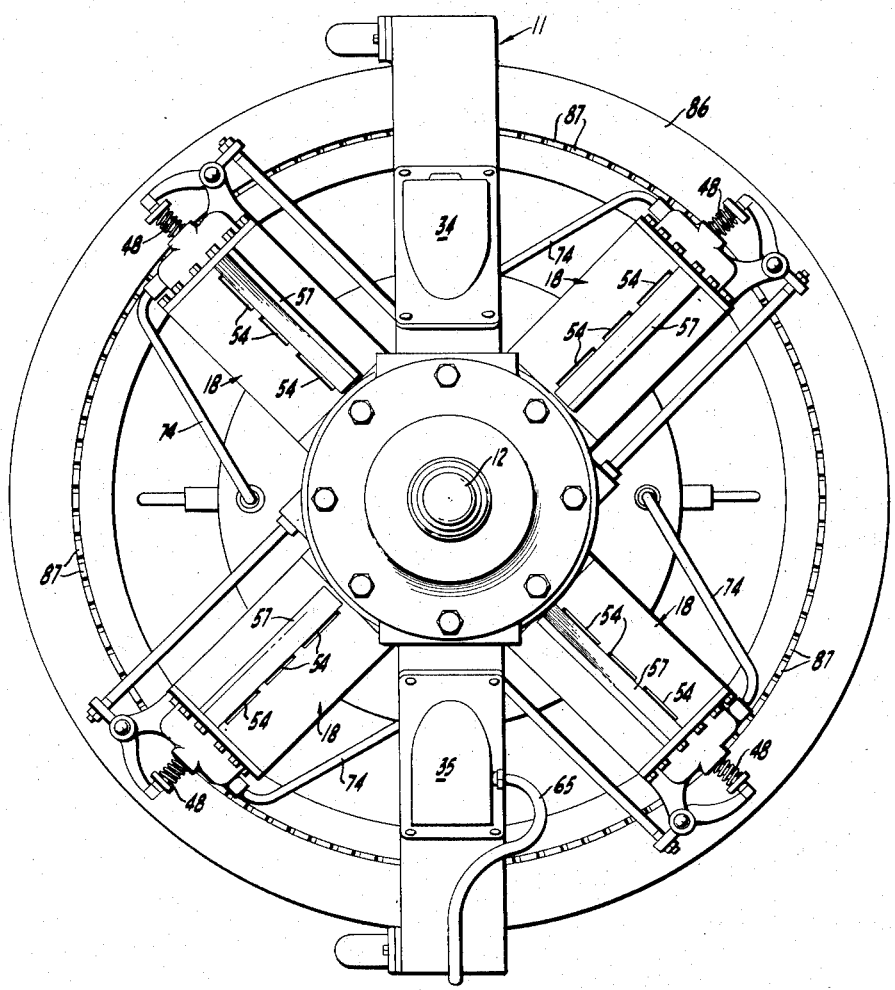
Fig. 2 is an end elevation of the same as seen from the left of Fig. 1.

Referring now to the drawings, and more particularly to Figs. 1 and 2, the engine, generally designated as 10, is of the two-cycle diesel or compression ignition type. It comprises a stationary frame 11, a crankshaft 12 and a crankcase 13. The crankshaft 12 is journaled in the frame at 14 and 15 by ball bearings, as illustrated, and it extends beyond the frame at the left thereof as viewed in Fig. 1 for attachment to a propeller. The crankcase is journaled in the frame at 16 and 17, and it carries four or any other desired number of cylinders 18 which are disposed radially and equi-angularly about the crankshaft.

It will be noted that the crankshaft is keyed at 25 to a bevel gear 26 and that the hub 27 of the crankcase is keyed at 28 to a similar bevel gear 29. Bevel gears 30 and 31 are journaled in the frame at 32 and 33, respectively, and they are in mesh with the bevel gears 26 and 29, as illustrated. A generator 34 is driven by the gear 30 and a fuel pump 35 by the gear 31, as illustrated. This placement of and drive for the generator and fuel pump are advantageous, but the principal function of the gears 26, 29, 30 and 31 is for balancing the motion and thrust of the crankshaft and crankcase as explained in detail hereinafter.

A piston 40 is reciprocable in each of the cylinders 18, and is connected to the crankshaft in the usual manner as by means of a rod 41, a crank 42, etc., as illustrated. Each cylinder 18 is provided with two exhaust ports 47 which are closed by check valves 48 of the usual construction and which are operated and timed in known manner, as by means of a cam 49 fixed to the crankshaft and interconnected with the check valves by suitable means well known in the art (not shown). An exhaust duct 50 is provided, which communicates with a turbine structure 51, and through the latter with an exhaust outlet 52, through which the exhaust gases are vented to the atmosphere. At its outer end where it communicates with the turbine structure, the duct 50 is formed as an annular chamber 50a extending circumferentially about the crankcase. The turbine structure 51 is described in detail hereinafter.

Each cylinder 18 is provided with a square casing 53 (see also Fig. 6) having air inlet ports 54, air outlet ports 55, separating ribs 56, and an air scoop 57. The function of these features is to cool the cylinder and to scavenge air from the cylinders and supply them with fresh air as described in detail hereinafter.

The fuel feed is from the pump 35 through a line 65 into an annular duct 66 formed in the frame, thence through oblique slots 67 (see Fig. 5), formed in an annular pump or valve member 68 which is sealed at 69 against the frame and is keyed at 70 to the hub of the crankcase. Thence the fuel is conducted through a duct 71 formed in the crankcase hub, through a line 72 to a high pressure injection pump 73, thence through a line 74 and inlet check valve (not shown) of the usual construction, to the head of each cylinder 18. The structure and operation of the high pressure pump 73 is described in detail hereinafter.

In operation, and as thus far described, the engine operates as follows:

When a piston 40 has reached the outer end of its stroke as illustrated by the top cylinder and piston in Fig. 1, a charge of fresh air has been compressed therein and fuel is injected into the cylinder. The cylinder then fires, causing downward movement of the piston on its power stroke, which results in rotation of the crankshaft and also of the crankcase at the same angular speed but in the opposite direction through the medium of the gears 26, 29, 30 and 31. Rotation of the cylinder causes scoop 57 to scoop air through ports 54, past the cylinder 18 and out through ports 55, thus cooling the cylinder. When the piston is in its inward position as illustrated by the bottom cylinder and piston in Fig. 1, an air inlet port 75 will be open and scoop 57 will force air through the port 75 into the cylinder and out through ports 47, which by this time will have been opened. The cylinder is thus scavenged of exhaust gases and is filled with fresh air. On the return stroke the outlet valves 48 will be closed, air will be compressed in the cylinder, and the cycle will be repeated. Since rotation of the cylinder 18 through 360° with respect to the frame results in rotation through an angle of 720° relatively to the crankshaft, it is obvious that each piston 18 will fire twice for each revolution with respect to the frame. Thus, in effect, an eight cylinder engine is provided by means of only four cylinders.

The turbine mechanism 51 (see Figs. 1, 3 and 8) comprises a rotor element 80 formed as a part of the crankcase and a stationary element 81 formed as part of the frame. The rotor element 89 comprises vanes 82 spaced apart to provide passages 83 and disposed circumferentially about the crankcase. The stationary element 81 comprises similarly spaced vanes 84 spaced apart to provide passages 85 formed in an annular rib 86 integral with the frame. The vanes 82 and 84 are pitched at an angle to each other, as illustrated. Sealing means is provided by rows of staggered and overlapping carbon blocks 87 disposed on opposite sides of the vanes and urged into sealing engagement with the crankcase by means of expansion springs 88.

It is apparent that exhaust gases passing through the vanes 82 and 84 will impart a thrust to the crankcase, thus accelerating its rotation and adding to the power output of the engine.

Figure 7:
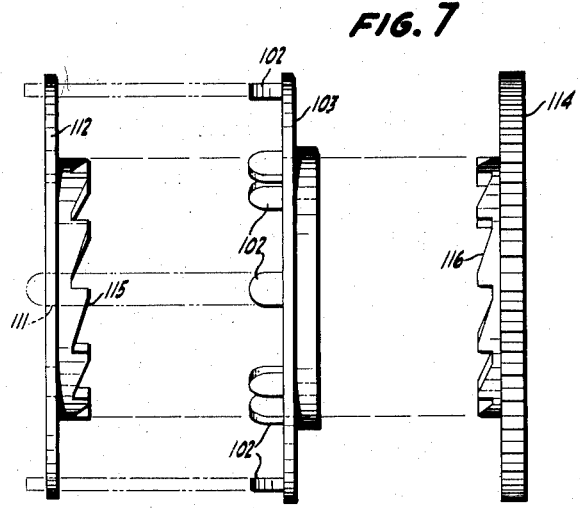
Fig. 7 is an exploded view of part of the throttle mechanism.

The high pressure fuel injection pump 73 is of the usual type comprising a piston 95 reciprocable in a cylinder 96 and having inlet and outlet check valves 97 and 98, respectively. The piston 95 is urged outwardly by a spring 99 bearing against a collar 100 having a roller 101. The piston 95 is urged inwardly to inject fuel into the engine, by means of cams 102 formed on a disc 103 (see also Figs. 4 and 7). It will be seen that the cams 102 have a steep rise and fall to cause rapid movement of the fuel pistons 95. During each revolution of a cylinder 18 its roller 101 contacts two of the cams 102 spaced 180° apart (see Fig. 4), corresponding to the two firing positions of the cylinder. As shown in Fig. 4, the cams 102 for one cylinder are located on an outermost circle 104 while those of the next cylinder (in the order of firing), are located on a circle 105 spaced inwardly from the circle 104, etc. Thus, as the crankcase rotates, fuel is injected into each cylinder twice per revolution in timed relation to the position of its piston 40 so as to fire the cylinder at the appropriate time.

The cams 102 extend through slots 111 formed in a disc 112 which is feather keyed to the frame at 113. The disc 112 and a rotatable gear 114 have complemental cam teeth 115 and 116 respecitvely. A pinion 117 on a shaft 118 is rotatable by a crank 119 to rotate the gear 114 with which it meshes.

It is apparent that, by rotating the crank 119 in one direction, the disc 112 will be brought nearer the rollers 101 and that the stroke of the piston 95 will be shortened. Hence the input of fuel to the engine will be decreased and the engine will be decelerated. Conversely, by rotating the crank oppositely, the stroke of the piston 95 will be lengthened and the engine will be accelerated accordingly.

A means of cranking and starting the engine is also provided. Thus a ring gear 120 is provided which is secured to the crankcase. A seal 121 is provided as shown. Any suitable starter (not shown) may be geared to the starter gear 120.

Figures 9, 10:
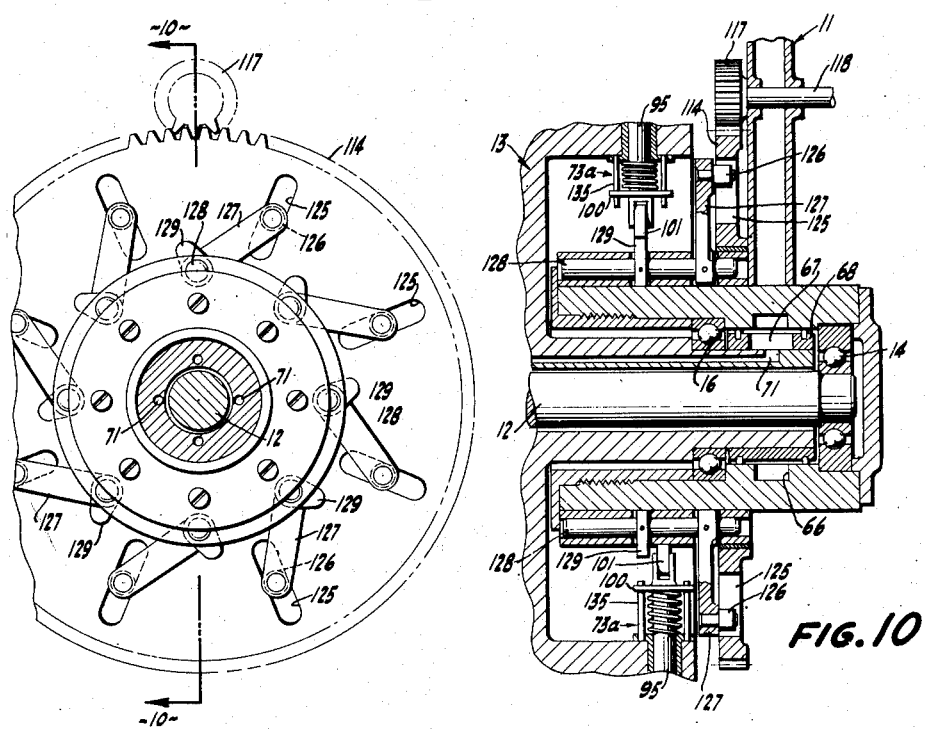
Fig. 9 is a view similar to that of Fig. 4, of a modification of the throttle mechanism.
Fig. 10 is a section taken along the line 10—10 of Fig. 9.

Referring now to Figs. 9 and 10, there is shown a modification of the throttle mechanism. In this modification the fuel injection pumps 73a are mounted perpendicularly to the crankshaft. The pinion 117, shaft 118 and crank (not shown) remain the same as described above, but the gear 114 with which the pinion 117 meshes is provided with radial slots 125, each of which guides a pin 126 on a lever 127, the other end of which is secured to a shaft 128 to which a cam 129 is secured. The rollers 101 of fuel injection pumps 73a contact the cams 129 to actuate the pump in the same manner as described above. It will be apparent that, by rotating the shaft 118, the angular positions of the cam 129, hence the stroke of the pistons 95 and the amount of fuel injected into the engine, will be regulated and the engine will be throttled accordingly.

It will also be noted that piston 95 is provided with a collar 100 which is slidable on studs 135. By this means rotation of the piston is prevented. This is advantageous because the piston is machined to a very close tolerance such that one given angular position relative to the cylinder 96 is preferred, other positions being likely to cause binding or looseness. Also, by this means, the rollers 101 are kept in accurate alignment with the cams 129.

It is thus apparent that an internal combustion engine has been provided which fulfills the object of counter-rotating crankshaft and crankcase and which possesses numerous advantageous features lacking in similar structures of the prior art. Thus, a balance is provided between the counter-rotating crankshaft and crankcase by means of the gears 26, 29, 30 and 31. Also, added power is gained by means of the turbine mechanism 51. Further advantages are provided by means of the air scavenging and supply means described hereinabove, and an improved throttling means is also provided.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A compression ignition engine comprising a frame, a crankshaft rotatable therein, a plurality of cylinders disposed radially of said crankshaft and rotatable relatively thereto and to said frame about the axis of said crankshaft, a piston reciprocable in each said cylinder and having a driving connection with said crankshaft, fuel feed means for each cylinder including a fuel injection pump having a cylinder and a piston reciprocable therein, means for actuating said piston comprising a plurality of cams fixed with respect to said frame, and means for varying the stroke of said piston to throttle said engine, said means comprising a rotatable member, means for rotating the same, and a member shiftable by rotation of said rotatable member and thereby determining the stroke of said piston.

2. A compression ignition engine comprising a frame, a crankshaft rotatable therein, a crankcase and a plurality of radial cylinders rotatable with respect to said frame and crankshaft about the axis of said crankshaft, a piston reciprocable in each cylinder and having a driving connection with said crankshaft, fuel feed means including a fuel injection pump for each cylinder, said pump comprising a fuel cylinder and a fuel piston reciprocable therein and resilient means urging said piston outwardly of said cylinder, and means for actuating and controlling said pump comprising a disc disposed concentrically of said crankshaft and having a plurality of cam projections so disposed as to urge said fuel pistons inwardly and fire said cylinders in sequence, a limit member limiting the outward travel of said fuel pistons and shiftable axially of said crankshaft, and throttle means for shifting said limit member axially.

3. A compression ignition engine comprising a frame, a crankshaft rotatable therein, a crankcase and a plurality of radial cylinders rotatable with respect to said frame and crankshaft about the axis of said crankshaft, a piston reciprocable in each cylinder and having a driving connection with said crankshaft, fuel feed means including a fuel injection pump for each cylinder, said pump comprising a fuel cylinder and a fuel piston reciprocable therein and resilient means urging said piston outwardly of said cylinder, and means for actuating and controlling said pump comprising a plurality of cams disposed radially about said crankshaft and rotatable to determine the stroke of said piston, and throttle means operable to rotate said cams.

PATRICK C. WARD.

References Cited in the file of this patent

UNITED STATES PATENTS

| Number | Name | Date |
| --- | --- | --- |
| 1,043,589 | Haubner | Nov. 5, 1912 |
| 1,111,682 | Sutton | Sept. 22, 1914 |
| 1,170,783 | Stedman | Feb. 8, 1916 |
| 1,203,767 | Moore | Nov. 7, 1916 |
| 1,291,884 | Highmark | Jan. 21, 1919 |
| 1,342,922 | Meyer | June 8, 1920 |
| 1,587,275 | Behn et al. | June 1, 1926 |
| 1,986,564 | Edwards | Jan. 1, 1935 |
| 2,001,533 | Houston | May 14, 1935 |
| 2,273,025 | Dillstrom | Feb. 17, 1942 |
| 2,273,900 | Sklenar | Feb. 24, 1942 |
| 2,348,958 | Celio | May 16, 1944 |
| 2,417,894 | Wayland | Mar. 25, 1947 |
| 2,456,164 | Youhouse | Dec. 14, 1948 |

FOREIGN PATENTS

| Number | Country | Date |
| --- | --- | --- |
| 53,200 | Austria | Apr. 25, 1912 |
| 459,965 | France | Sept. 22, 1913 |
| 647,833 | Germany | July 14, 1937 |